United States Patent [19]
Ota et al.

[11] Patent Number: 5,257,856
[45] Date of Patent: Nov. 2, 1993

[54] METHOD OF AND SYSTEM FOR CONTROLLING BRAKES

[75] Inventors: Atsuo Ota; Osamu Suzuki; Takushi Matsuto, all of Wako, Japan

[73] Assignee: Honda Giken Kogyo Kabushiki Kaisha, Tokyo, Japan

[21] Appl. No.: 916,255

[22] Filed: Jul. 21, 1992

[30] Foreign Application Priority Data

Jul. 23, 1991 [JP] Japan .................. 3-182703
Oct. 14, 1991 [JP] Japan .................. 3-264971

[51] Int. Cl.⁵ ............................................. B60T 8/32
[52] U.S. Cl. ................................ 303/100; 180/219;
188/181 A; 188/344; 188/195; 303/22.1;
303/115.2
[58] Field of Search ............... 303/100, 102, 103, 106,
303/115.2, 115.6, 115.1, 113.2, 22.1–22.8;
188/344, 195, 181 A, 181 R; 280/703; 180/219

[56] References Cited

U.S. PATENT DOCUMENTS

| | | | |
|---|---|---|---|
| 4,664,233 | 5/1987 | Tsuchida et al. | 188/181 A |
| 4,694,938 | 9/1987 | Hayashi et al. | 188/181 A |
| 4,702,339 | 10/1987 | Hayashi et al. | 180/219 |
| 4,792,194 | 12/1988 | Hayashi et al. | 188/181 A X |
| 4,923,027 | 5/1990 | Hayashi et al. | 188/344 X |
| 4,989,922 | 2/1991 | Pickenhahn et al. | 303/100 |

FOREIGN PATENT DOCUMENTS

0149137 7/1985 European Pat. Off. .
0246790 11/1987 European Pat. Off. .
0395225 10/1990 European Pat. Off. .
WO91/09759 7/1991 PCT Int'l Appl. .

*Primary Examiner*—Douglas C. Butler

[57] ABSTRACT

Disclosed herein is a method of and a system for controlling brakes. In the brake control system, grounding loads on front and rear wheels are determined and a correction value for the braking of a predetermined wheel is computed based on the grounding loads thus determined. A braking force is determined inclusive of the computed correction value. A correction value for the braking of the front wheel is computed based on the determined grounding loads. Thus, the optimum brake control can be made without being affected by a variation in the distribution of the loads of the front and rear wheels relative to the ground.

13 Claims, 14 Drawing Sheets

METHOD OF AND SYSTEM FOR CONTROLLING BRAKES

BACKGROUND OF THE INVENTION

1. Field of the Invention

The present invention relates to a method of and a system for controlling brakes wherein braking forces of the brakes are computed based on ground loads of front and rear wheels.

2. Description of the Related Art

In a motorcycle, for example, an antilock control system is known in which an antilocking modulator is disposed between a master cylinder for converting a brake operating instruction issued by operating a lever and a pedal by a driver into desired hydraulic pressure and a caliper cylinder for causing brake disks of wheels to generate braking forces, and a control unit is supplied with signals indicative of front- and rear-wheel speeds, and a caliper pressure control signal is outputted to the modulator so as to brake each wheel based on a computed slip ratio and both an acceleration and a deceleration of each wheel, for example.

When the braking of each wheel is carried out, the distribution of the grounding loads between the front and rear wheels tends to vary. In particular, the grounding load distribution in the front wheel tends to increase. It is therefore necessary for a driver to control the motorcycle in response to a variation in the ground load distribution in each of the front and rear wheels.

SUMMARY OF THE INVENTION

It is a principal object of the present invention to provide a method of and a system for controlling brakes attached to a vehicle wherein the optimum braking of each of front and rear wheels can be easily carried out without being affected by variations in the distribution of the grounding loads between the wheels.

It is another principal object of the present invention to provide a system for controlling brakes attached to a vehicle which is capable of controlling braking forces without reducing the grounding load on a rear wheel in particular when the braking of a front wheel is made.

It is another object of the present invention to provide a method of controlling brakes attached to a vehicle, comprising the following steps of: determining grounding loads on front and rear wheels at the time of running of the vehicle, computing a correction value for the braking of a predetermined wheel based on the determined grounding loads, and determining a braking force inclusive of the computed correction value.

It is a further object of the present invention to provide a method of controlling brakes attached to a vehicle wherein a correction value for the braking of the front wheel is computed based on the determined ground loads.

It is a still further object of the present invention to provide a method of controlling brakes attached to a vehicle, comprising the following steps of: determining grounding loads on front and rear wheels at the time of running of the vehicle, computing a target angle of a crank member abutted against an expander piston which forms a modulator together with the crank member and increases the volume of an output hydraulic chamber when antilock braking is made, computing a value for the correction of the target angle based on the determined grounding loads, and determining a braking force inclusive of the computed value for the correction of the said target angle.

It is a still further object of the present invention to provide a method of controlling brakes attached to a vehicle wherein a correction angle of a crank member for the front wheel, which corresponds to a target angle of the crank member for the front wheel, is computed based on the determined grounding loads.

It is a still further object of the present invention to provide a system for controlling brakes attached to a vehicle, comprising target angle computing means for computing a target angle of a crank member abutted against an expander piston which forms a modulator together with the crank member and increases the volume of an output hydraulic chamber when antilock braking is made, grounding load detecting means for detecting grounding loads on front and rear wheels at the time of running of the vehicle, correction value computing means for computing a value for the correction of the target angle based on the detected grounding loads, and target angle correcting means for computing a corrected target angle based on the computed correction value and the target angle.

It is a still further object of the present invention to provide a system for controlling brakes attached to a vehicle, comprising detecting means for detecting the rotational speed of a rear wheel, calculating means for calculating a rear-wheel deceleration from the detected rotational speed, determining means for determining that a rear-wheel grounding load is less than or equal to a predetermined value when the deceleration falls within a preset range about zero during the operation of a front-wheel brake, and controlling means for reducing and controlling a braking force of the front-wheel brake based on the result of determination by the determining means.

It is a still further object of the present invention to provide a system for controlling brakes attached to a vehicle, comprising detecting means for detecting the rotational speed of a rear wheel, calculating means for calculating a rear-wheel deceleration from the detected rotational speed, determining means for determining that a rear-wheel grounding load is less than or equal to a predetermined value when the deceleration is smaller than a predetermined value while front-wheel and rear-wheel brakes are being operated, and controlling means for reducing and controlling a braking force of the front-wheel brake based on the result of determination by the determining means.

It is a still further object of the present invention to provide a system for controlling brakes attached to a vehicle, comprising controlling means for controlling a braking force of a front-wheel brake to prevent a front wheel from being locked under the operation of the front-wheel brake, detecting means for detecting the rotational speed of a rear wheel, calculating means for calculating a rear-wheel deceleration from the detected rotational speed, and determining means for determining that a rear-wheel grounding load is less than or equal to a predetermined value when the deceleration falls within a preset range about zero during the operation of the controlling means, whereby the controlling means is activated to reduce and control and braking force of the front-wheel brake when the rear-wheel grounding load is less than or equal to the predetermined value.

It is a still further object of the present invention to provide a system for controlling brakes attached to a vehicle, comprising controlling means for controlling a braking force of a front-wheel brake to prevent a front wheel from being locked under the operation of the front-wheel brake, detecting means for detecting the rotational speed of a rear wheel, calculating means for calculating a rear-wheel deceleration from the detected rotational speed, and determining means for determining that a rear-wheel grounding load is less than or equal to a predetermined value when the deceleration is smaller than a preset value during the operation of at least the controlling means, whereby the controlling means is activated to reduce and control the braking force of the front-wheel brake when the rear-wheel grounding load is less than or equal to the predetermined value.

It is a still further object of the present invention to provide a system for controlling brakes attached to a vehicle, comprising detecting means for detecting the rotational speed of a rear wheel, calculating means for calculating a rear-wheel deceleration from the detected rotational speed, determining means for determining that a rear-wheel grounding load is less than or equal to a predetermined value when the deceleration continuously falls within a preset range about zero for a predetermined period of time or longer during the operation of a front-wheel brake, and controlling means for reducing and controlling a braking force of the front-wheel brake based on the result of determination by the determining means.

It is a still further object of the present invention to provide a system for controlling brakes attached to a vehicle, comprising detecting means for detecting the rotational speed of a rear wheel, calculating means for calculating a rear-wheel deceleration from the detected rotational speed, determining means for determining that a rear-wheel grounding load is less than or equal to a predetermined value when the deceleration is continuously smaller than a preset value for a predetermined period of time or longer while front-wheel and rear-wheel brakes are being operated, and controlling means for reducing and controlling a braking force of the front-wheel brake based on the result of determination by the determining means.

It is a still further object of the present invention to provide a system for controlling brakes attached to a vehicle wherein deceleration detecting means for detecting a deceleration is provided as an alternative to the detecting means and the calculating means.

It is a still further object of the present invention to provide a system for controlling brakes, attached to a vehicle further including hydraulic pressure detecting means for detecting caliper hydraulic pressure of the front-wheel brake and wherein the determining means determines that the grounding load of the rear wheel is less than or equal to a predetermined value when the caliper hydraulic pressure is larger than a predetermined hydraulic pressure value.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
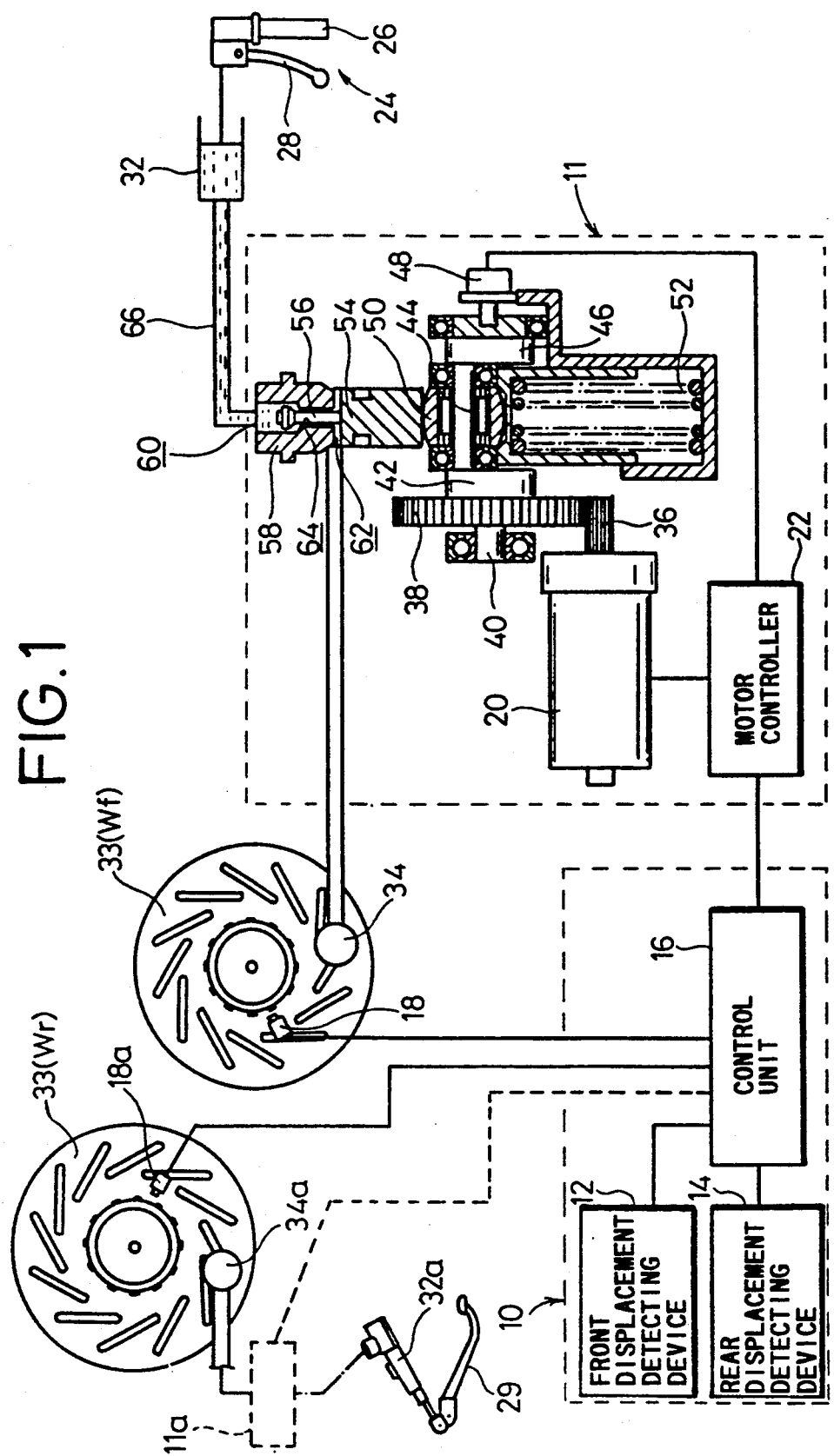
FIG. 1 is a schematic view showing a brake control system according to a first embodiment of the present invention, which is used to perform a brake control method according to the present invention.
Figure 2:
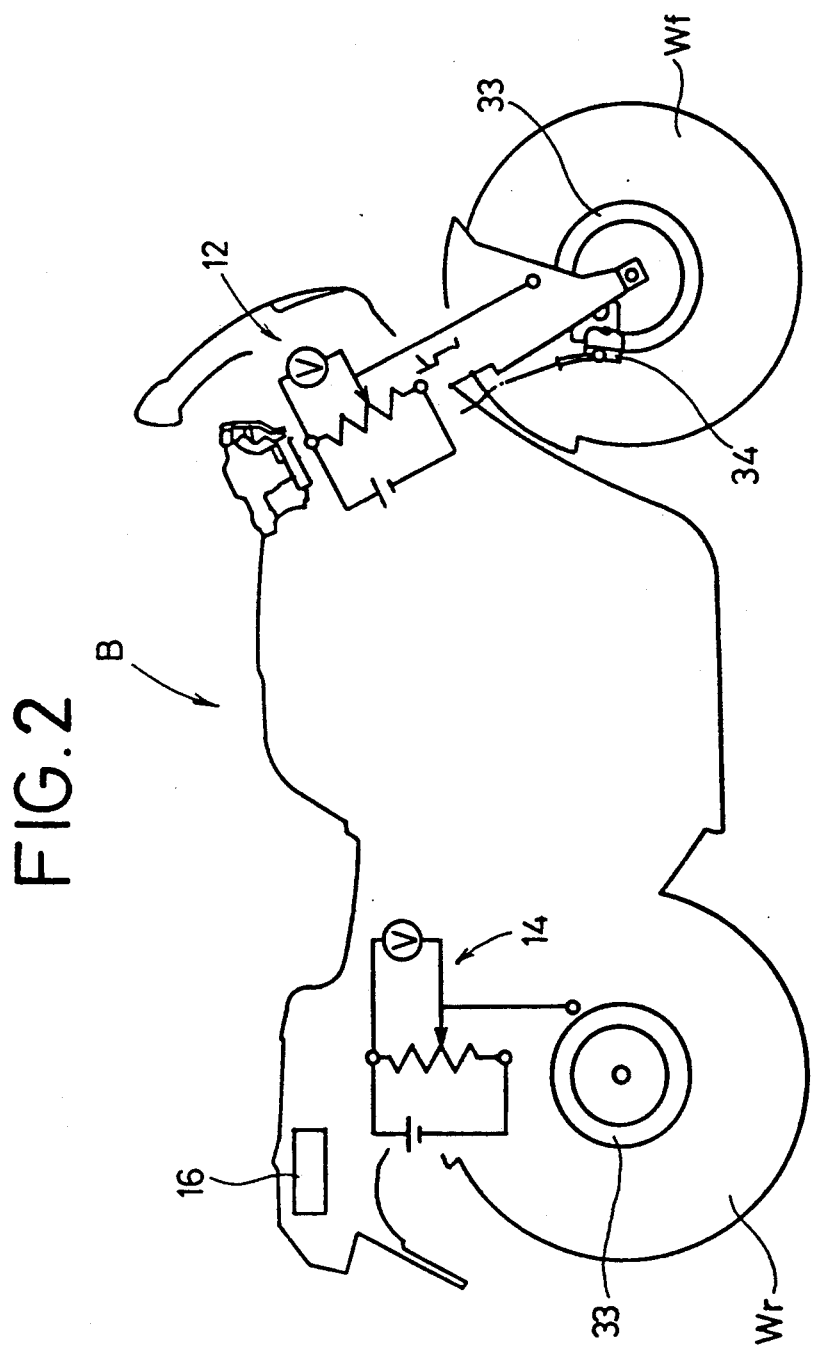
FIG. 2 is a schematic side view showing a motorcycle on which the brake control system shown in FIG. 1 has been mounted.

In FIG. 2, reference numeral B indicates a motorcycle used to perform a method of controlling brakes, which is applied to a brake control system 13 according to a first embodiment of the present invention. The brake control system 13, which is provided with a vehicle-body condition detecting apparatus 10 and main bodies 11, 11a controlled by the vehicle-body condition detecting apparatus 10, is mounted on the motorcycle B (see FIG. 1).

The vehicle-body condition detecting apparatus 10 comprises a front displacement detecting device 12 attached to a front suspension of a front wheel Wf, a rear displacement detecting device 14 attached to a rear suspension of a rear wheel Wr, and a control unit 16 disposed on the lower side of the rearmost end of a seat. For example, potentiometers each used to detect a displacement indicative of predetermined compression or extension of the suspension from the difference between divided voltages are used as the front displacement detecting device 12 and the rear displacement detecting device 14. Incidentally, a potentiometer disposed in a pivot unit of a swing arm can also be used as the rear displacement detecting device 14.

Figure 3:
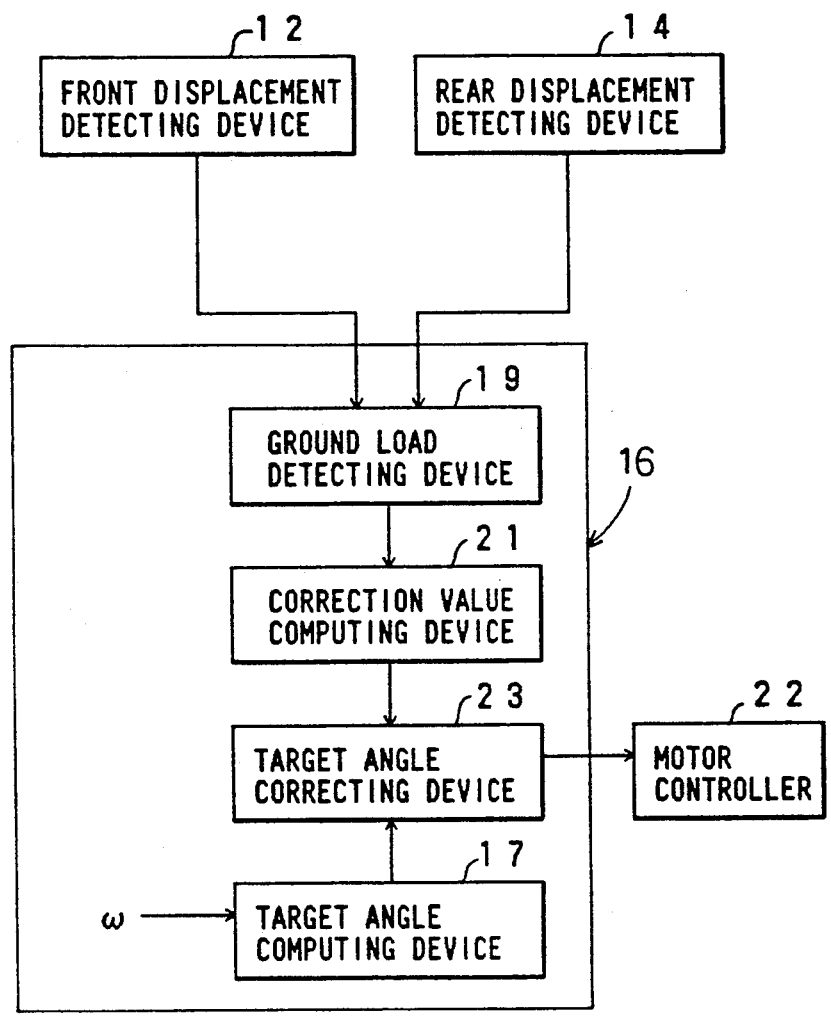
FIG. 3 is a view showing the structure of a control unit employed in the brake control system.

Then, signals detected by the front displacement detecting device 12 and the rear displacement detecting device 14 are supplied to the control unit 16. The control unit 16 is activated to cause each of vehicle speed sensors 18, 18a disposed in the vicinity of the front and rear wheels Wf, Wr to detect the angular velocity ω of each wheel to thereby receive therein pulse signals each indicative of the angular velocity w of each wheel. As shown in FIG. 3, the control unit 16 comprises a target angle computing device (means) 17 for computing a target angle of a crank pin (crank member) 44 to be described later, a grounding oad detecting device (means) 19 for detecting surface or grounding loads of the front and rear wheels Wf, Wr in response to the signals detected from the front displacement detecting device 12 and the rear displacement detecting device 14, a correction value computing device (means) 21 for computing a value for the correction of the target angle based on the detected ground loads, and a target angle correcting device (means) 23 for computing a corrected target angle from both the computed correction value and target angle.

As shown in FIG. 1, a braking device 24 comprises a master cylinder 32 actuated by a brake lever 28 attached to a handle 26, and a caliper cylinder 34 for braking the front wheel Wf. The master cylinder 32 and the caliper cylinder 34 are interconnected with each other via the brake control system 13. The master cylinder 32 is actuated to adjust hydraulic pressure under the action of the brake lever 28 so as to transmit desired pressure to a cut valve to be described later. On the other hand, the caliper cylinder 34 is actuated to apply a braking force to a disk plate 33 based on the hydraulic pressure controlled by the cut valve.

The main body 11 of the front wheel Wf has a motor controller 22 for supplying current to a d.c. motor 20 which constitutes a modulator and stopping the supply of the current to the d.c. motor 20 to thereby drive and control the d.c. motor 20. The motor controller 22 is electrically connected to the control unit 16 so as to receive a signal from the control unit 16. A pinion 36 is coupled to a drive shaft of the d.c. motor 20 and held in meshing engagement with a gear 38. A crank shaft 40 is fixedly mounted in the center of the gear 38. One end of the crank pin 44 is coupled via a crank arm 42 to the crank shaft 40. A crank arm 46 is coupled to the other end of the crank pin 44, and a potentiometer 48 for detecting a displacement angle of the crank pin 44 is coupled to the crank arm 46.

A cam bearing 50 is rotatably mounted on the outer peripheral surface of the crank pin 44. The cam bearing 50 is pressed upward by return springs 52. An expander piston 54, which is vertically moved under the displacement action of the cam bearing 50, is abutted against the upper surface of the cam bearing 50. Thus, the cut valve 56 is opened and closed under an up-and-down movement of the expander piston 54. The cut valve 56 is disposed in a cut valve holder 58 so that it can be moved in upward and downward directions. An input port 60, which communicates with the master cylinder 32, is defined above the surface of the cut valve 56, whereas an output port 62, which communicates with the caliper cylinder 34 is defined in a continuous or connecting portion between the cut valve holder 58 and the expander piston 54. The input port 60 and the output port 62 communicate with each other through a communication hole 64 defined in the outer peripheral surface of the cut valve 56.

On the other hand, the main body 11a of the rear wheel Wr serves to cause a master cylinder 32a coupled to a brake pedal 29 of the rear wheel Wr to communicate with a caliper cylinder 34a coupled to a disk plate 33 of the rear wheel Wr. In addition, the main body 11a is identical in structure to the main body 11, and its detailed description will therefore be omitted.

The brake control method according to the present embodiment will now be described below in connection with the brake control system 13.

A description will first be made of the detection of loads at the time that the wheels of the motorcycle B make contact with the ground. Incidentally, the following various computations are executed in the control unit 16 supplied with the signals output from the front displacement detecting device 12, the rear displacement detecting device 14 and the vehicle speed sensors 18, 18a.

The following relational expression is normally established between a displacement S of each suspension and a grounding load F of each wheel:

$$F = f(S) + g(\Delta S/\Delta t) \tag{1}$$

where a function f(S) represents a vertical load component of a spring at the position where each wheel makes contact with the ground and a function g(ΔS/Δt) represents a vertical load component based on a damping or attenuation characteristic at the position where each wheel makes contact with the ground. Incidentally, ΔS/Δt represents the quantity of a variation in time with respect to the displacement of each suspension.

Figure 4:
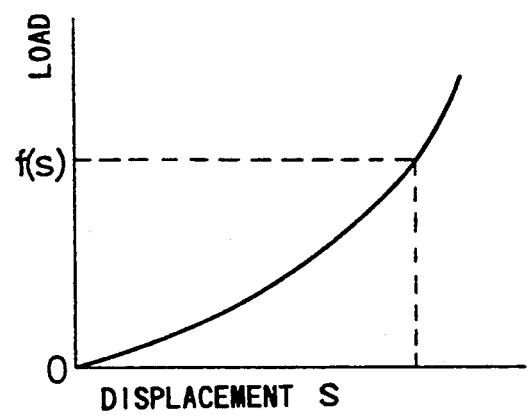
FIG. 4 is a view for describing the relationship between a displacement of a suspension and a load.
Figure 5:
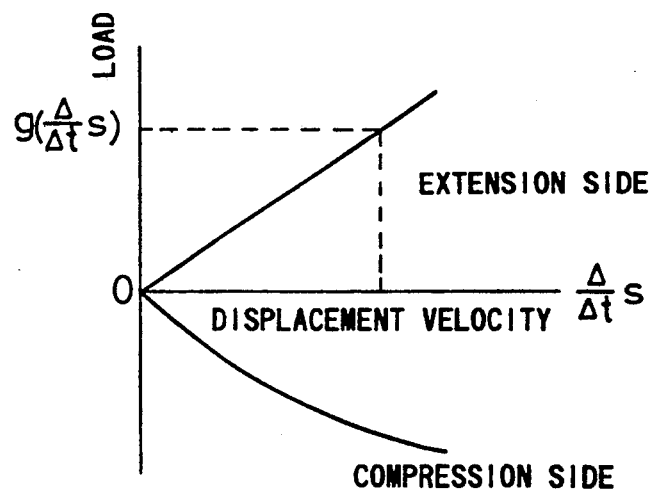
FIG. 5 is a view for describing the relationship between a displacement velocity and a load.
Figure 6:
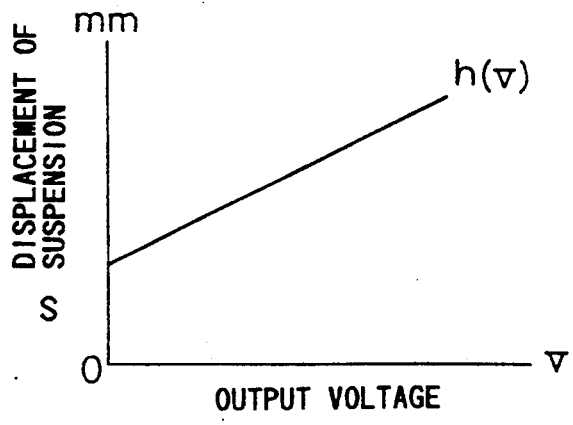
FIG. 6 is a view for describing the relationship between the voltage output from a displacement detecting means and the displacement of the suspension.

Now, the characteristics of the functions f(S) and g(ΔS/Δt) are inherent in a vehicle and can be measured in advance. Such characteristics are shown in FIGS. 4 and 5 as examples. In addition, the displacement S of each suspension can be determined from a function h(V) indicative of the voltages output from the front displacement detecting device 12 and the rear displacement detecting device 14. That is, the displacement S corresponding to compression or extension of each of the front and rear suspensions is detected as the voltage V output from each of the front and rear displacement detecting devices 12, 14, thereby making it possible to determine the displacement S of each of the front and rear wheels. Then, the vertical load component f(S) of the spring at the position where each wheel makes contact with the ground is determined based on the so-determined displacement S from a characteristic curve shown in FIG. 4 for describing the relationship between the load and the displacement S. Likewise, the load component g(ΔS/Δt) as seen in the vertical direction from each wheel is determined from a characteristic curve shown in FIG. 5. Thus, the wheel grounding loads can be obtained by calculating the sum of the two components.

Figure 7:
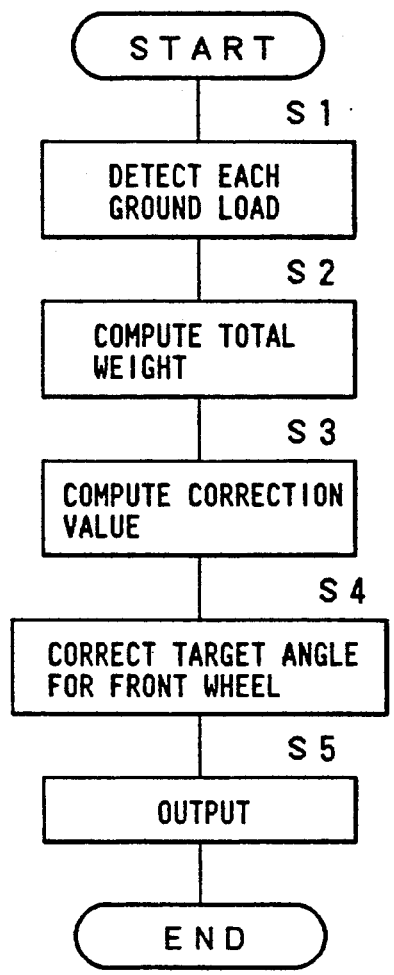
FIG. 7 is a flowchart for describing the brake control method shown in FIG. 1.

After a front-wheel ground load WFR and a rear-wheel grounding load WRR have been detected by the grounding load detecting device 19 (see Step S1 in FIG. 7 and FIG. 8), they are added together to calculate the total weight WT (Step S2). Then, the correction value computing device 21 performs an arithmetic operation on a correction angle (correction value) ΔθTF for the front wheel based on the rear-wheel grounding load WRR and the total weight WT (see Step S3 and FIG. 9). Now, $\alpha_0$ in FIG. 9 represents a load sharing proportion or ratio at the time that the rear wheel makes contact with the ground while the motorcycle or vehicle is normally running. When the load sharing ratio is smaller than $\alpha$, i.e., the load distribution at the time that the front wheel makes contact with the ground is increased in proportion, a desired correction is made.

Figure 8:
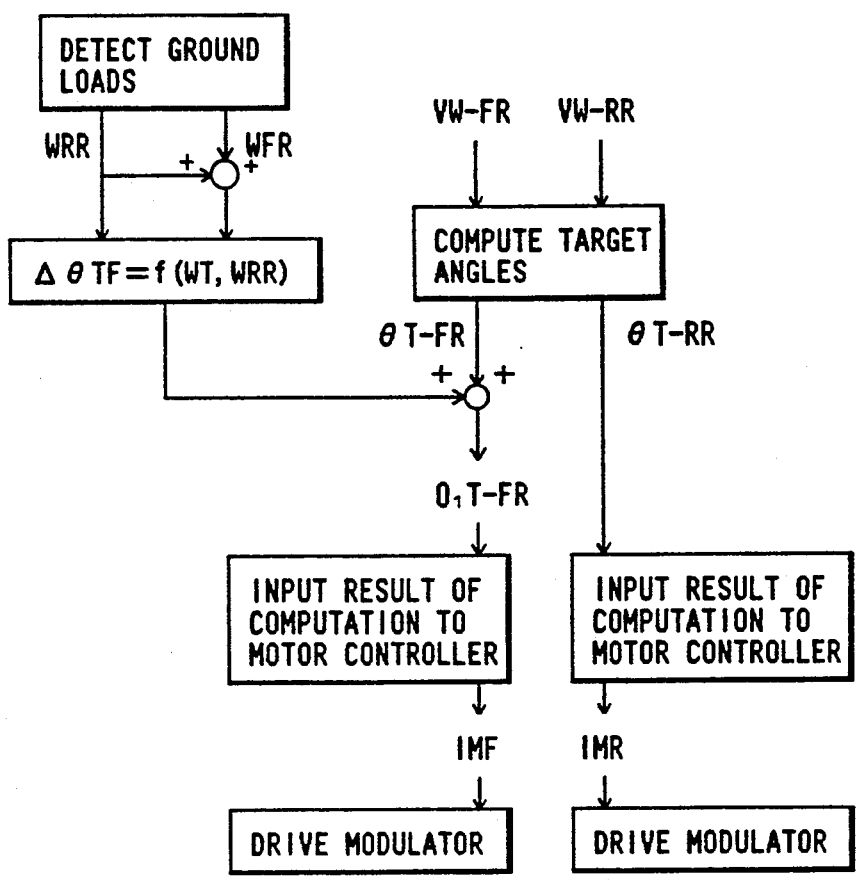
FIG. 8 is a schematic view for describing the brake control method shown in FIG. 1.
Figure 9:
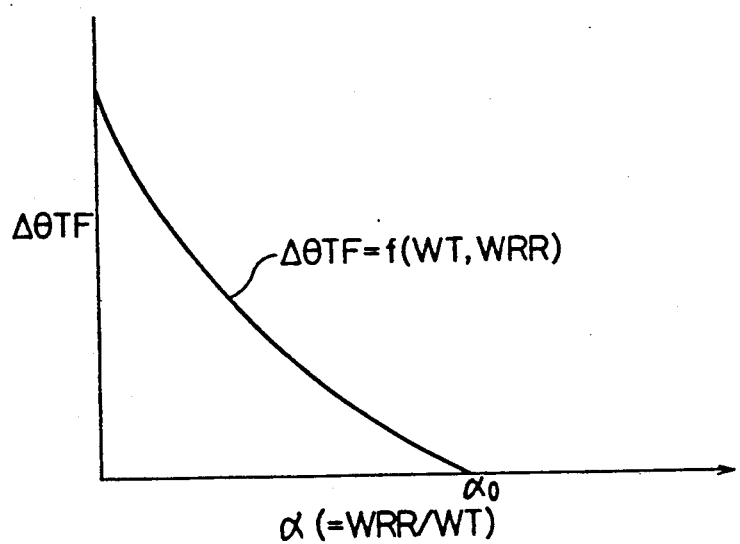
FIG. 9 is a view for describing the relationship between a grounding load sharing ratio and a correction value.

On the other hand, the target angle computing device 17 performs arithmetic operations on target angles $\theta$T-FR, $\theta$-RR of the crank pin 44 of the modulator based on a front-wheel speed or velocity VW-FR and a rear-wheel speed or velocity VW-RR detected as outputs from the vehicle speed sensors 18, 18a respectively disposed in the vicinity of the wheels (see FIG. 8). Then, the target angle correcting device 23 adds together the target angle $\theta$T-FR and the correction angle $\Delta\theta$TF to thereby determine a corrected target angle $\theta$1T-FR for the front wheel (see Step S4). Afterwards, the target angle $\theta$1T-FR for the front wheel and the $\theta$1T-RR for the rear wheel are supplied as data to the motor controllers 22 of the main bodies 11, 11a, respectively (see Step S5).

Upon normal braking, the cam bearing 50 disposed in each of the main bodies 11, 11a is maintained at the top dead center by resilient forces of the return springs 52 so as to hold the expander piston 54 in a forced-up state (see the state shown in FIG. 2). Thus, the cut valve 56 is forced up by the expander piston 54 so as to cause the input port 60 to communicate with the output port 62. When the brake lever 28 is gripped at this time, braking hydraulic pressure generated by the master cylinder 32 is transmitted to the caliper cylinder 34 through a passage 66, the input port 60, the communication hole 64, the output port 62 and a passage 68 in that order.

As described above, the control unit 16 then supplies control signals to the corresponding motor controllers 22 based on other information such as the target angle $\theta$1T-FR for the front wheel and the target angle $\theta$T-RR for the rear wheel so as to energize and de-energize the d.c. motor 20. When the d.c. motor 20 is energized, a rotatable shaft (not shown) of the d.c. motor 20 is rotatably driven to turn the pinion 36, thereby displacing the crank pin 44 through the gear 38 maintained in meshing engagement with the pinion 36, the crank shaft 40 and the crank arm 42. When the crank pin 44 is displaced in this way, the cam bearing 50 is moved away from the top dead center and the braking hydraulic pressure applied to the expander piston 54 is added to the torque developed by the d.c. motor 20. Therefore, when the expander piston 54 is lowered a predetermined amount, the cut valve 56 serves to block or close the communication hole 64 so as to prevent the input port 60 and the output port 62 from communicating with each other. When the expander piston 54 is further lowered, the volume on the output port 62 side increases so as to decrease the hydraulic pressure applied to the caliper cylinder 34, thereby decreasing a braking force applied to the front wheel Wf. Incidentally, each position of the expander piston 54 is detected as the crank angle by the potentiometer 48 and then introduced as data into the corresponding motor controller 22 to thereby control the d.c. motor 20.

Figure 10:
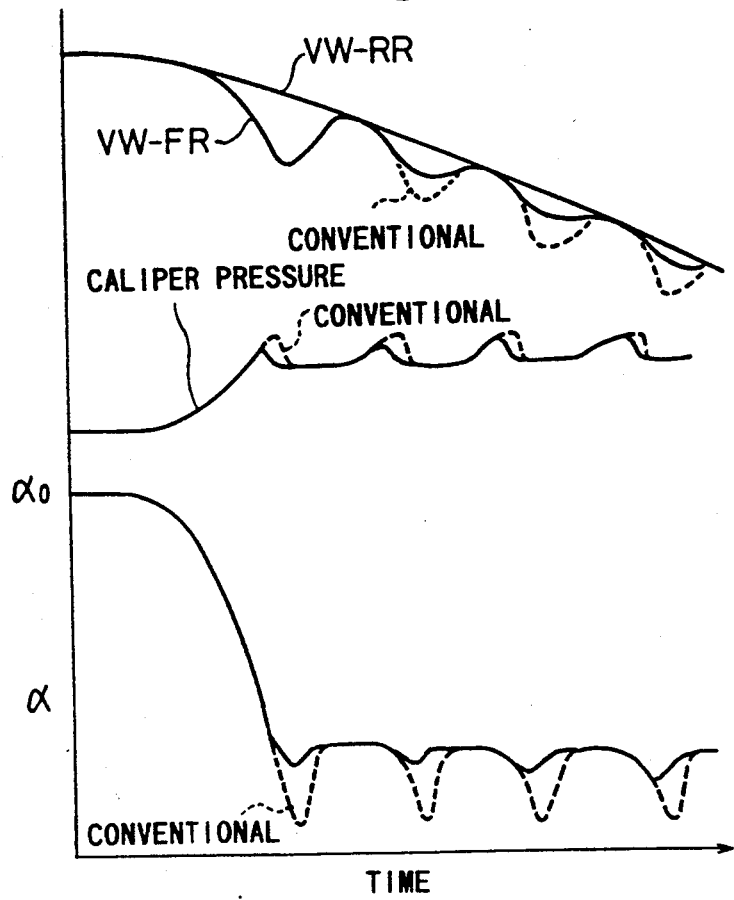
FIG. 10 is a view for describing a corresponding relationship between the brake control method according to the present invention and a convention brake control method at the time of braking of a front wheel.

In the present embodiment, the correction angle $\Delta\theta$TF for the front wheel is computed based on the rear-wheel grounding load WRR and the total weight WT after the front-wheel grounding load WFR and the rear-wheel grounding load WRR have been detected. Then, the corrected target angle $\theta$1T-FR for the front wheel is determined based on the computed correction angle $\Delta\theta$TF. Afterwards, the modulator is controlled based on the corrected target angle $\theta$1T-FR for the front wheel. Therefore, the load distribution at the time that the front wheel Wf and the rear wheel Wr make contact with the ground can be prevented from appreciably varying upon braking of the wheels, thereby making it possible to ensure a sufficient grounding load of the rear wheel Wr. That is, when the caliper pressure is estimated from the velocity of the front wheel Wf without taking into consideration a variation in the grounding load distribution as shown in FIG. 10 (see the broken lines in the drawing), a change in a load sharing ratio $\alpha$ at the time that the rear wheel Wr makes contact with the ground increases, so that the control feeling or the response to control greatly varies from the normal running state. In the present embodiment, however, a change in $\alpha$ can be reduced as small as possible, thereby making it possible to approach the control feeling at the normal running state (see the solid lines in the drawing).

Incidentally, the present embodiment has shown a case in which the potentiometers for detecting the displacement corresponding to the predetermined compression or extension of each suspension from the difference between the divided voltages are used as the front displacement detecting device 12 and the rear displacement detecting device 14 for detecting the front-wheel grounding load WFR and the rear-wheel grounding load WRR respectively. However, the present invention is not necessarily limited to the present embodiment. For example, various sensors such as a stress sensor, etc. can be used as an alternative to the above potentiometers.

A brake control system according to a second embodiment will now be described below in detail with the accompanying drawings.

Figure 11:
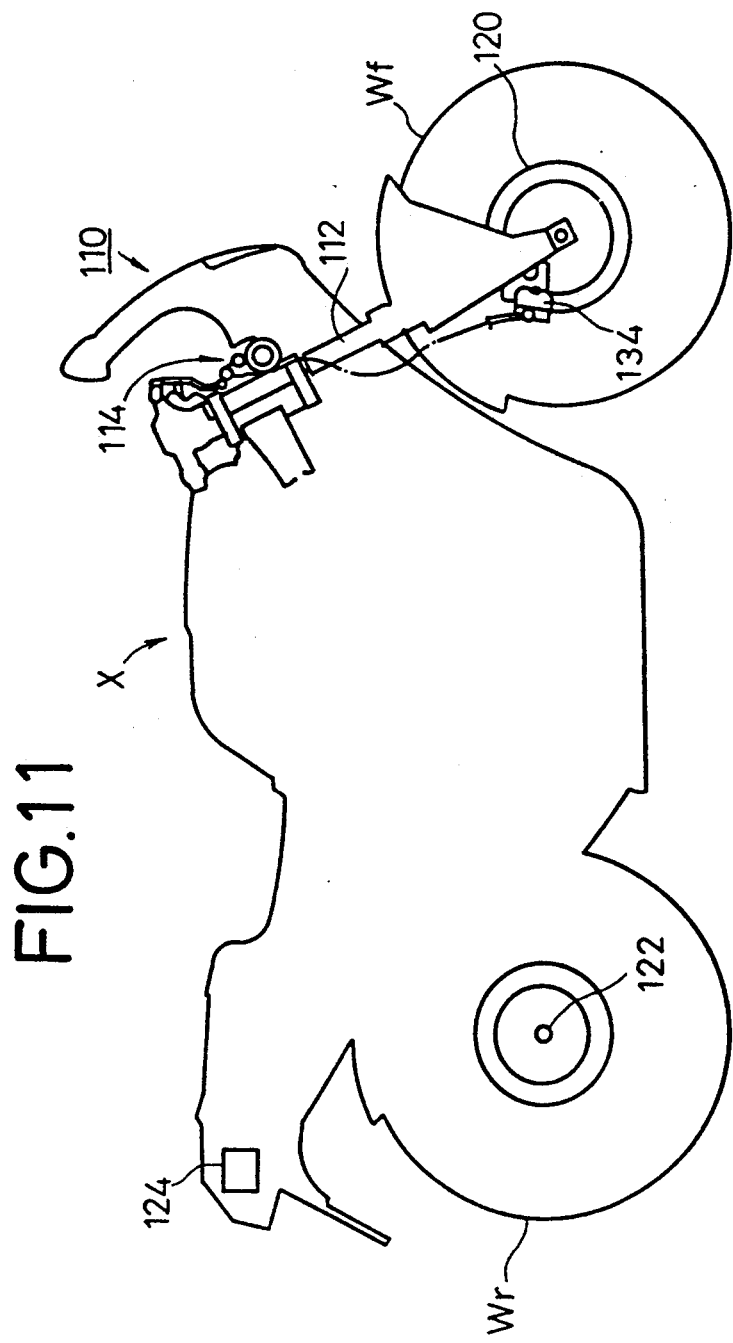
FIG. 11 is an overall side view showing a motorcycle on which a brake control system according to a second embodiment of the present invention has been mounted.
Figure 12:
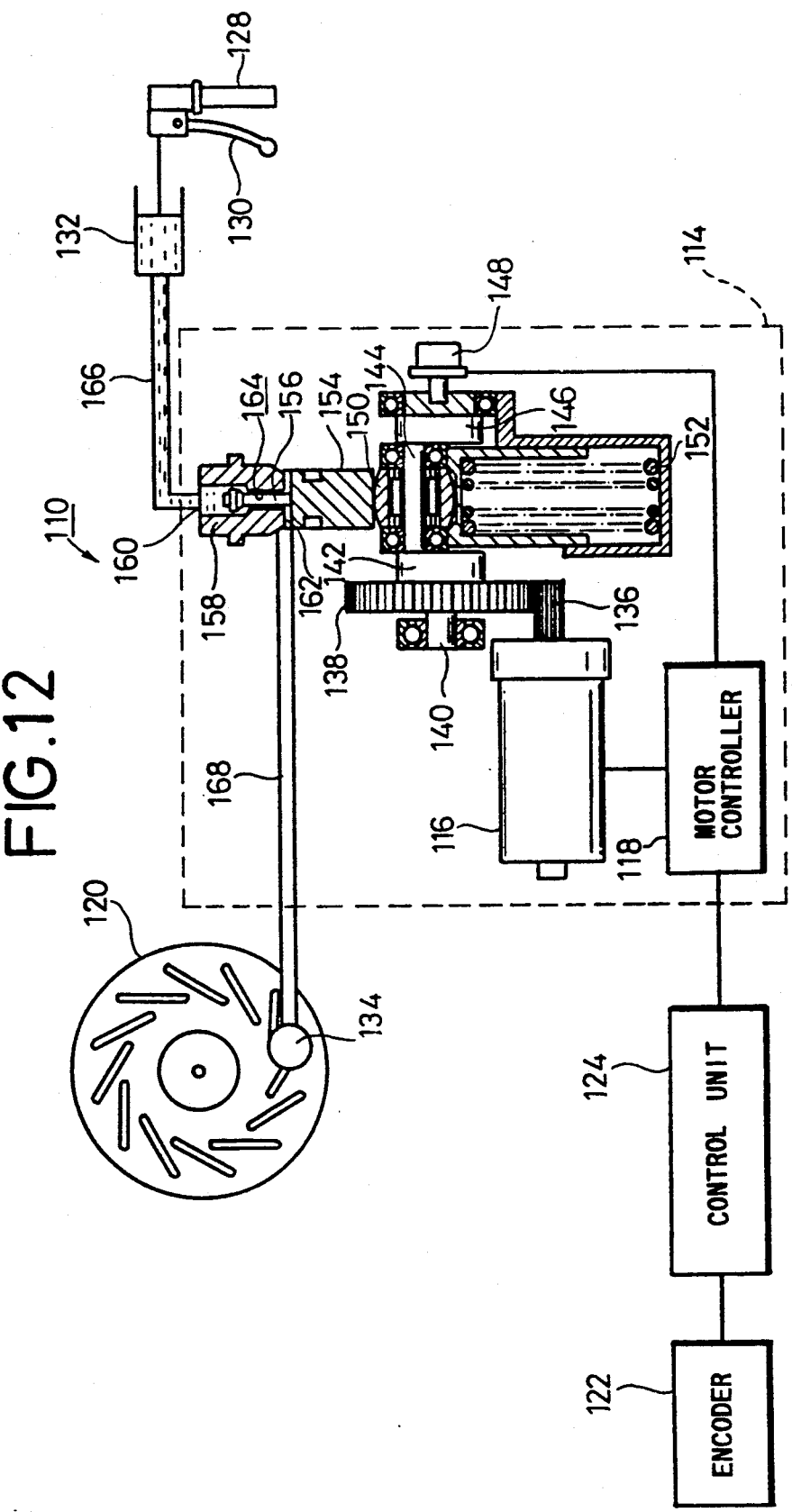
FIG. 12 is a view illustrating the structure of the brake control system shown in FIG. 11.
Figure 13:
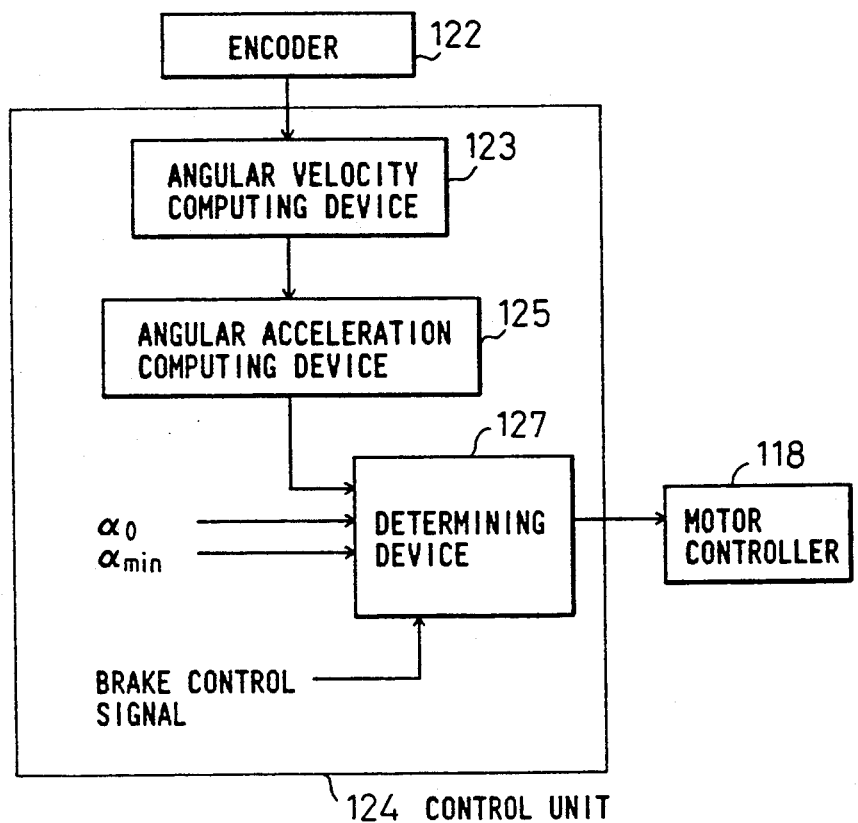
FIG. 13 is a view showing the structure of a control unit employed in the brake control system shown in FIG. 11.

FIG. 11 is a side view showing the overall structure of a motorcycle X on which the brake control system 110 according to the second embodiment has been mounted. FIG. 12 is a view illustrating the structure of the brake control system 110. The brake control system 110 basically comprises a main body 114 disposed above a front fork 112, and a control unit 124 which is electrically connected to a motor controller 118 for driving and controlling a d.c. motor 116 coupled to the main body 114 and which is used to control the main body 114. In this case, the control unit 124 is activated to cause an encoder 122 (detecting means) attached to a rear wheel Wr to detect a wheel angular speed or velocity $\omega$. Then, the control unit 124 performs an arithmetic operation on a wheel angular acceleration $d\omega/dt$ [which will be hereinafter regarded as $\alpha$ (i.e., $d\omega/dt = \alpha$)] based on a pulse signal indicative of the wheel angular velocity $\omega$ and supplies a signal indicative of the result of its computation to the motor controller 118. As illustrated in FIG. 13, the control unit 124 has an angular velocity computing device 123, an angular acceleration computing device 125 serving as a computing means, and a determining device 127 serving as a determining means. The signal detected from the encoder 122 is introduced into the angular velocity computing device 123 where the wheel angular velocity $\omega$ is calculated. Then, the angular acceleration computing device 125 calculates the wheel angular acceleration $\alpha$ based on the calculated wheel angular velocity $\omega$. The determining device 127 makes a decision as to whether or not the wheel angular acceleration $\alpha$ falls within a predetermined value and supplies the result of determination to the motor controller 118.

A front-wheel braking device has a master cylinder 132 which is driven by a brake lever 130 attached to a handle 128, and a caliper cylinder 134 used to brake a front wheel Wf. The master cylinder 132 and the caliper cylinder 134 are mutually connected to each other via the main body 114 disposed above the front fork 112. The master cylinder 132 adjusts the hydraulic pressure under the action of the brake lever 130 and transmits the adjusted hydraulic pressure to a cut valve 156 to be described later. On the other hand, the caliper cylinder 134 serves to apply braking to a disk plate 120 based on the hydraulic pressure controlled by the cut valve 156.

As shown in FIG. 12, the brake control system 110 includes the d.c. motor 116 serving as a drive source, which has a drive shaft connected with a pinion 136 which is maintained in meshing engagement with a gear 138. A crank shaft 140 is fixedly mounted in the center of the gear 138. One end of a crank pin 144 is coupled via a crank arm 142 to the crank shaft 140. A crank arm 146 is coupled to the other end of the crank pin 144, and a potentiometer 148 for detecting a displacement angle of the crank pin 144 is coupled to the crank arm 146. A cam bearing 150 is rotatably mounted on the outer peripheral surface of the crank pin 144. The cam bearing 150 is pressed upward by return springs 152. An expander piston 154, which is moved upward and downward under the displacement action of the cam bearing 150, is abutted against the upper surface of the cam bearing 150. Thus, the cut valve 156 is opened and closed under an up-and-down movement of the expander piston 154. The cut valve 156 is disposed in a cut valve holder 158 so that it can be moved in upward and downward directions. An input port 160, which communicates with the master cylinder 132, is defined above the surface of the cut valve 156, whereas an output port 162, which communicates with the caliper cylinder 134, is defined in a continuous or connecting portion between the cut valve holder 158 and the expander piston 154. The input port 160 and the output port 162 communicate with each other through a communication hole 164 defined in the outer peripheral surface of the cut valve 156.

The brake control system 110 according to the second embodiment is constructed as described above. The operation of the brake control system 110 will now be described below.

Upon normal braking, the cam bearing 150 is maintained at the top dead center by resilient forces of the return springs 152 to thereby hold the expander piston 154 in a forced-up state. Thus, the cut valve 156 is forced up by the expander piston 154 so as to be forcibly brought into an open state. Then, when the brake lever 130 is gripped, braking hydraulic pressure generated by the master cylinder 132 is transmitted to the caliper cylinder 134 through a passage 166, the input port 160, the communication hole 164, the output port 162 and a passage 168 in that order.

Figure 14:
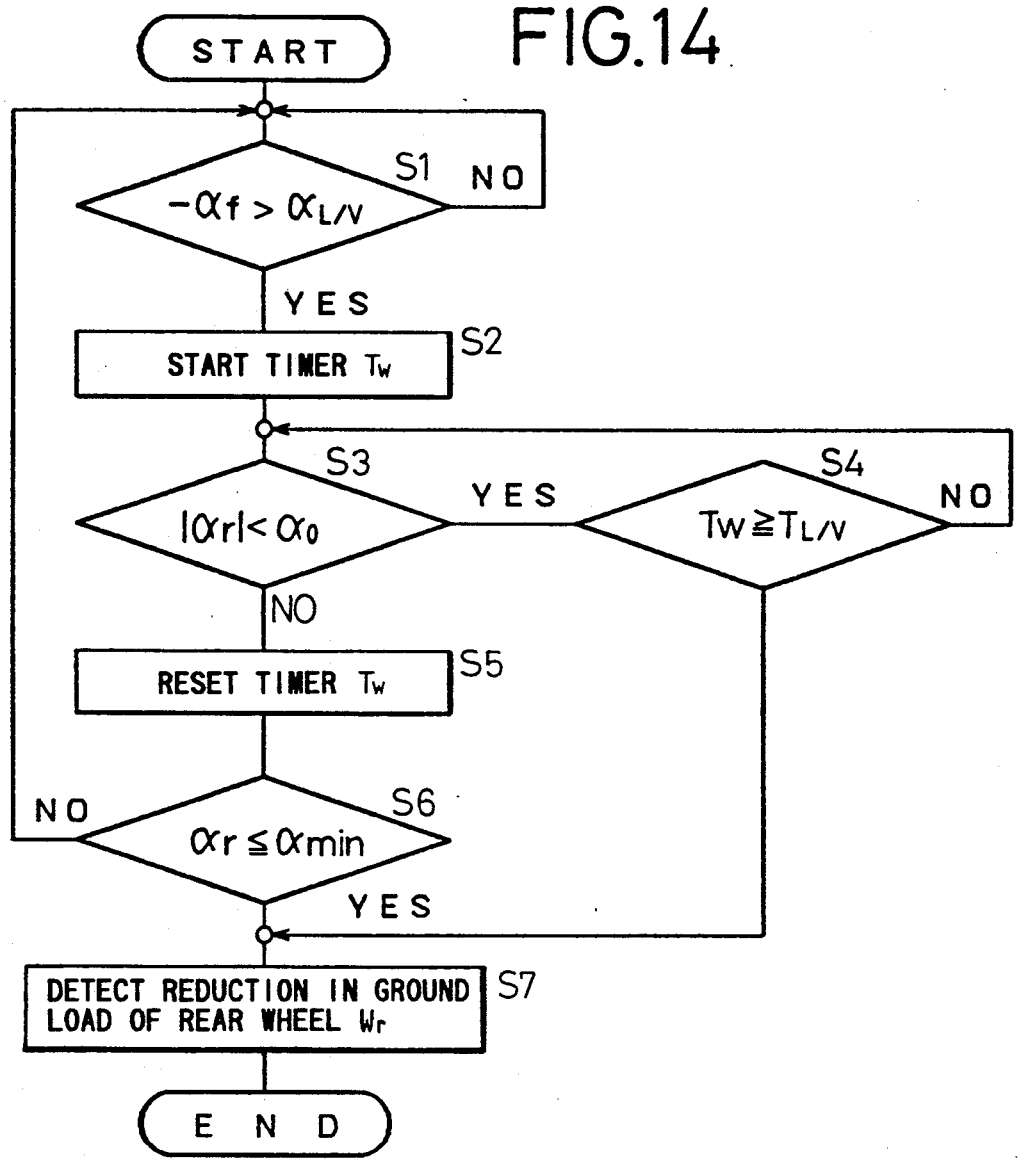
FIG. 14 is a flowchart for describing the operation of the brake control system shown in FIG. 11.

A description will now be made, with reference to a flowchart shown in FIG. 14, to a case in which the braking of the front wheel Wf is made while the motorcycle X is running at a desired wheel angular velocity $\omega$, and the grounding load of the rear wheel Wr, which is reduced by decelerating the wheel angular velocity $\omega$, is detected in this condition.

It is first necessary to reduce the body velocity of the motorcycle X to a given set value or below in order to reduce the grounding load of the rear wheel Wr and set it to a limit grounding load (hereinafter called a "$W_{LiM}$") which makes it hard to receive information fed back from a road surface. Then, the angular acceleration $\alpha$ (hereinafter called "front-wheel angular acceleration $\alpha_f$) of the front wheel Wf is compared with a set value $\alpha_{L/V}$ to thereby detect the result of its comparison (Step S1). Incidentally, the front-wheel angular velocity $\alpha_f$ is regarded as $-\alpha_f$ because it becomes a negative value due to the above deceleration, whereas the set value $\alpha_{L/V}$ is taken as a positive value. The set value $\alpha_{L/V}$ represents a value at the time that the grounding load of the rear wheel Wr, which is preset based on the dimensions and test data of the vehicle body, reaches $W_{LiM}$. In this case, the signal detected from the encoder 122 attached to the rear wheel Wr is supplied via the angular velocity computing device 123 to the angular acceleration computing device 125 where the front-wheel angular acceleration $\alpha_f$ is computed. Then, the determining device 127 makes a decision as to whether or not the front-wheel angular acceleration $-\alpha_f$ outputted from the angular acceleration computing device 125 is larger than the set value $\alpha_{L/V}$.

Figure 15:
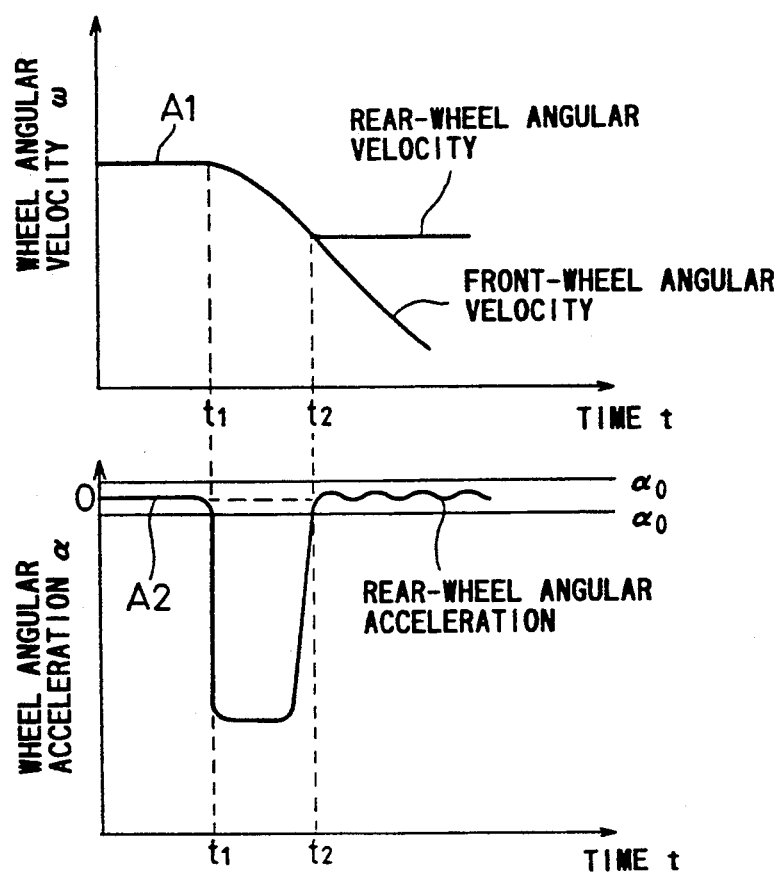
FIG. 15 is a view for describing the relationship between the angular velocity of each wheel and the angular acceleration of each wheel.
Figure 16:
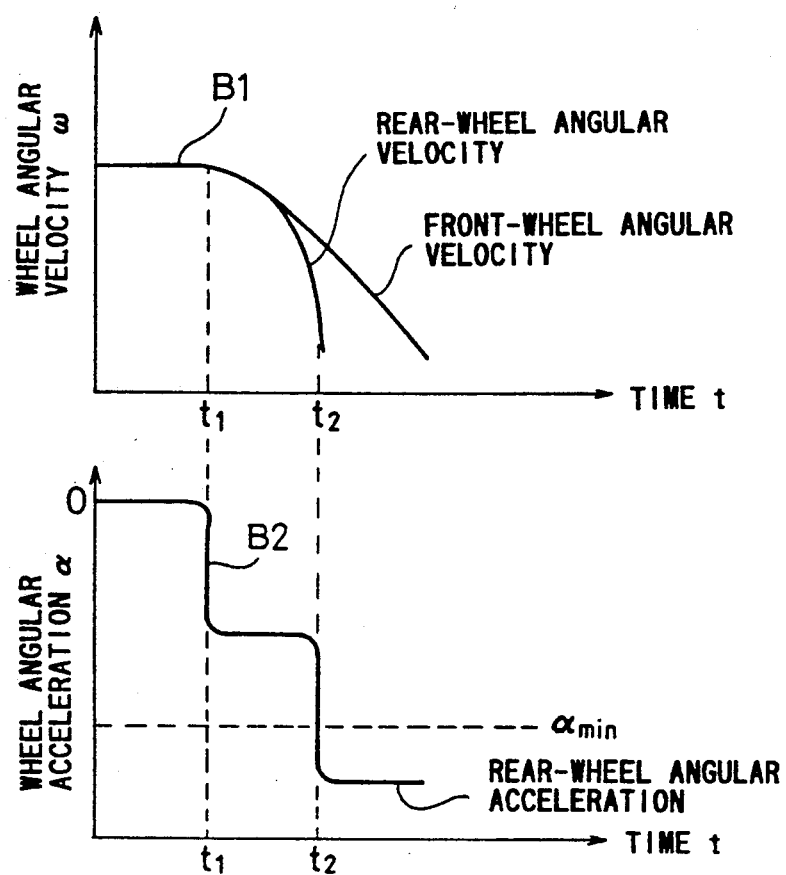
FIG. 16 is a view for describing the relationship between the angular velocity of each wheel and the angular acceleration of each wheel.

In order to reduce or decelerate the body velocity of the motorcycle X, the following two cases are known in which only the braking device of the front wheel Wf is actuated at a time $t_1$ as shown in FIG. 15 (see Steps S2 through S4) and the braking devices of the front and rear wheels Wf and Wr are simultaneously actuated at a time $t_1$ as illustrated in FIG. 16 (see Steps S6 and S7).

In the former case, as indicated by a wheel angular velocity curve A1 in FIG. 15, the angular velocity $\omega$ of the rear wheel Wr reaches a substantially constant value at a time $t_2$ when a predetermined time interval has elapsed from the time $t_1$. When the wheel angular velocity curve A1 is associated with a wheel angular acceleration curve A2, the wheel angular acceleration curve A2 indicative of a wheel angular acceleration $\alpha$ (hereinafter called "a rear-wheel angular acceleration $\alpha_r$) of the rear wheel Wr falls within the range between a wheel angular acceleration $\alpha_0$ ($\alpha > 0$) preset to 0 and a wheel angular acceleration $-\alpha_0$ while the wheel angular velocity curve A1 is continuously maintained at a substantially constant value. When the time for holding this state exceeds a preset time $T_{L/V}$ (Steps S2 and S4), it can be determined that the grounding load of the rear wheel Wr has been reduced (Steps S3 and S7). This is based on the following reason. That is, since the rear wheel Wr is reduced in the grounding load and rotated in a substantially free state, the wheel angular velocity curve A1 does not fall and is maintained at a substantially constant value. In addition, the wheel angular acceleration curve A2 corresponding to such a wheel angular velocity curve A1 is also held at a value near to 0.

In the latter case, on the other hand, the angular velocity $\omega$ of the rear wheel Wr is rapidly reduced as indicated by a wheel angular velocity curve B1 in FIG. 16 at a time $t_2$ when a predetermined time interval has elapsed from a time $t_1$. When a rear-wheel angular acceleration $\alpha_r$ is less than or equal to a preset lower-limit wheel angular acceleration $\alpha_{min}$ in accordance with the decrease in the angular velocity $\omega$ of the rear wheel Wr, it can be determined that the grounding load of the rear wheel Wr has been reduced (Step S6). This is because when the grounding load of the rear wheel Wr is reduced, the rear wheel Wr rapidly stops rotating under the action of the braking device and the angular acceleration $a_r$ of the rear wheel Wr assumes a large negative value.

Figure 17:
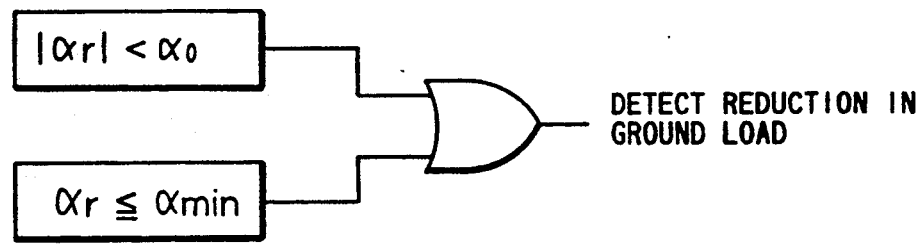
FIG. 17 is a view for describing the operation of the brake control system shown in FIG. 11.

FIG. 17 is a view for describing the logic of the determining device 127 in the control unit 124. If the angular acceleration $a_r$ of the rear wheel Wr falls within an allowable range near zero, i.e., $\pm a_0$ (Step S3) or $a_r$ is less than or equal to the lower-limit wheel angular acceleration $a_{min}$ (Step S6) in FIG. 17, it is then determined that the grounding load of the rear wheel Wr has been reduced (Step S7).

If it is determined in the control unit 124 that the grounding oad of the rear wheel Wr has been reduced, then the control unit 124 is activated to cause the motor controller 118 to energize and de-energize the d.c. motor 116. When the d.c. motor 116 is energized, a rotatable shaft (not shown) of the d.c. motor 116 is rotatably driven to rotate the pinion 136 coupled to the rotatable shaft thereof. Then, the crank pin 144 is rotated in response to the rotation of the pinion 136 through the gear 138 held in meshing engagement with the pinion 136, and the crank shaft 140 and the crank arm 142 both coupled to the gear 138. The cam bearing 150 is moved away from the top dead center under the rotation of the crank pin 144 so as to lower the expander piston 154. As a result, the cut valve 156 is closed to stop the supply of the braking hydraulic pressure to the caliper cylinder 134 of the front wheel Wf. When the expander piston 154 is further lowered from this condition, the braking hydraulic pressure to be supplied to the caliper cylinder 134 is reduced to increase the angular velocity $\omega$ of the front wheel Wf. As a result, a reduction in the grounding load of the rear wheel Wr can be avoided.

Figure 18:
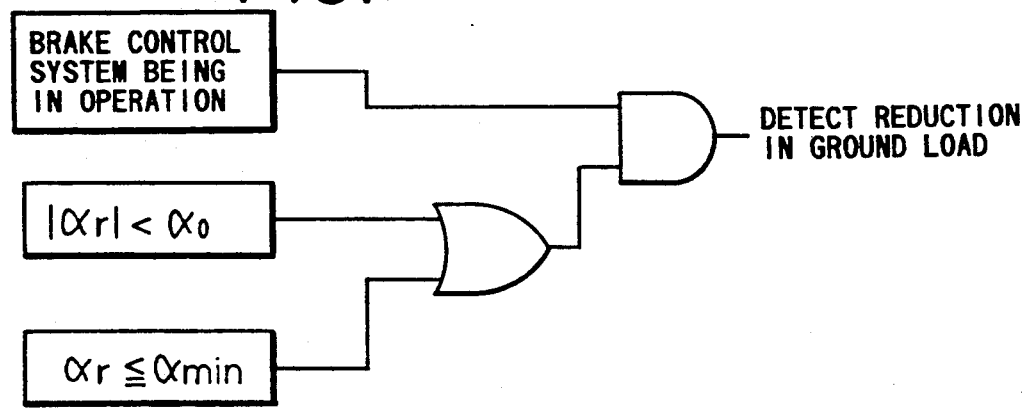
FIG. 18 is a view for describing the operation of a brake control system according to a third embodiment of the present invention.

FIG. 18 is a view for describing other logic of a determining device 127 in a brake control system 110 according to a third embodiment of the present invention. It is determined in the determining device 127 whether or not the angular acceleration $a_r$ of the rear wheel Wr is less than or equal to the lower-limit wheel angular acceleration $a_{min}$ while the main body 114 is in operation. Alternatively, it is determined whether or not the absolute value of the angular acceleration $a_r$ of the rear wheel Wr falls within the allowable range $a_0$ during the operation of the main body 114. As a result, a decision can be made as to whether or not the grounding load of the rear wheel Wr has been reduced. The above judgments may be carried out during the operation of the braking device of the front wheel Wf as an alternative to during the operation of the main body 114. Further, the second embodiment has shown a case in which the brake control system 110 has been attached to the front wheel Wf. It is however needless to say that the brake control system 110 may be attached to either the rear wheel Wr or both wheels Wf, Wr.

As an alternative to the angular velocity computing device 123 and the angular acceleration computing device 125, a device for directly measuring a deceleration of the rear wheel Wr using an acceleration sensor or the like can also be provided, thereby making it possible to detect the grounding load of the rear wheel Wr based on the measured output. Further, the pressure of brake fluid supplied to the caliper cylinder 134 can also be measured by a pressure sensor or the like so as to detect the grounding load of the rear wheel Wr under certain pressure or above.

The present embodiment has shown a case in which a sensor is attached to the rear wheel Wr and a means for controlling a brake disposed on the front wheel Wf side is provided. However, the control similar to that performed in the present embodiment can be carried out even in the case where both of a sensor and a brake control means are mounted to the front and rear wheels respectively or even in the other case.

In the brake control method according to the present invention, after the grounding loads of respective wheels at the time of running of a vehicle such as a motorcycle have been determined, a predetermined correction value for the braking of each wheel is computed as data based on the determined ground loads. Further, the data about the computed correction value is electrically processed together with other data so as to obtain a braking signal. Therefore, the most suitable braking force can be obtained according to a variation in the grounding load distribution of the front and rear wheels. Particularly, the grounding load distribution on the front wheel can be prevented from increasing upon braking. It is thus possible to easily improve the control feeling at the time that the braking is applied to the vehicle.

Further, in the brake control system according to the present invention, a value for correcting a target angle of a crank member is computed based on a grounding load of each wheel to thereby correct the target angle based on the computed correction value. Therefore, the optimum brake control can be effected without being affected by a variation in the grounding load distribution between the front and rear wheels.

Furthermore, in the brake control system according to the present invention, a reduction in the grounding load on the rear wheel can be judged from the deceleration of the rear wheel. A further reduction in the grounding load on the rear wheel can be reliably avoided by reducing and controlling the braking force of the front wheel based on the result of judgment. As a result, the front and rear wheels can be maintained at a suitable grounding state at all times. It is also possible to apply the brakes in a comfortable feeling at all times.

Having now fully described the invention, it will be apparent to those skilled in the art that many changes and modifications can be made without departing from the spirit or scope of the invention as set forth herein.

What is claimed is:

1. A method of controlling brakes attached to a vehicle, comprising steps of:
    determining grounding loads of front and rear wheels at the time of running of the vehicle;
    computing a correction value for the braking of a predetermined wheel based on said determined grounding loads; and
    determining a braking force inclusive of said computed correction value.

2. A method according to claim 1, wherein a correction value for the braking of said front wheel is computed based on said determined grounding loads.

3. A method of controlling brakes attached to a vehicle, comprising steps of:
    determining grounding loads of front and rear wheels at the time of running of the vehicle;
    computing a target angle of a crank member abutted against an expander piston which forms a modulator together with the crank member and increases the volume of an output hydraulic chamber when antilock braking is made;
    computing a value for the correction of said target angle based on said determined grounding loads; and determining a braking force inclusive of said computed value for the correction of said target angle.

4. A method according to claim 3, wherein a correction angle of a crank member for the front wheel, which corresponds to a target angle of said crank member for the front wheel, is computed based on said determined grounding loads.

5. A system for controlling brakes attached to a vehicle, comprising:

target angle computing means for computing a target angle of a crank member abutted against an expander piston which forms a modulator together with the crank member and increases the volume of an output hydraulic chamber when antilock braking is made;

grounding load detecting means for detecting grounding loads of front and rear wheels at the time of running of the vehicle;

correction value computing means for computing a value for the correction of said target angle based on said detected grounding loads; and target angle correcting means for computing a corrected target angle based on said computed correction value and said target angle.

6. A system for controlling brakes attached to a vehicle, comprising:

detecting means for detecting the rotational speed of a rear wheel;

calculating means for calculating a rear-wheel deceleration from said detected rotational speed;

determining means for determining that a rear-wheel grounding load is less than or equal to a predetermined value when said deceleration falls within a preset range about zero during the operation of a front-wheel brake; and controlling means for reducing and controlling a braking force of the front-wheel brake based on said result of determination by said determining means.

7. A system for controlling brakes attached to a vehicle, comprising:

detecting means for detecting the rotational speed of a rear wheel;

calculating means for calculating a rear-wheel deceleration from said detected rotational speed;

determining means for determining that a rear-wheel grounding load is less than or equal to a predetermined value when said deceleration is smaller than a predetermined value while front-wheel and rear-wheel brakes are being operated; and controlling means for reducing and controlling a braking force of the front-wheel brake based on said result of determination by said determining means.

8. A system for controlling brakes attached to a vehicle, comprising:

controlling means for controlling a braking force of a front-wheel brake to prevent a front wheel from being locked under the operation of said front-wheel brake;

detecting means for detecting the rotational speed of a rear wheel;

calculating means for calculating a rear-wheel deceleration from said detected rotational speed; and determining means for determining that a rear-wheel grounding load is less than or equal to a predetermined value when said deceleration falls within a preset range about zero during the operation of said controlling means;

whereby said controlling means is activated to reduce and control the braking force of said front-wheel brake when said rear-wheel grounding load is less than or equal to said predetermined value.

9. A system for controlling brakes attached to a vehicle, comprising:

controlling means for controlling a braking force of a front-wheel brake to prevent a front wheel from being locked under the operation of said front-wheel brake;

detecting means for detecting the rotational speed of a rear wheel;

calculating means for calculating a rear-wheel deceleration from said detected rotational speed; and determining means for determining that a rear-wheel grounding load is less than or equal to a predetermined value when said deceleration is smaller than a preset value during the operation of at least said controlling means;

whereby said controlling means is activated to reduce and control the braking force of said front-wheel brake when said rear-wheel grounding load is less than or equal to said predetermined value.

10. A system for controlling brakes attached to a vehicle, comprising:

detecting means for detecting the rotational speed of a rear wheel;

calculating means for calculating a rear-wheel deceleration from said detected rotational speed;

determining means for determining that a rear-wheel grounding load is less than or equal to a predetermined value when said deceleration continuously falls within a preset range about zero for a predetermined period of time or longer during the operation of a front-wheel brake; and controlling means for reducing and controlling a braking force of the front-wheel brake based on the result of determination by said determining means.

11. A system for controlling brakes attached to a vehicle, comprising:

detecting means for detecting the rotational speed of a rear wheel;

calculating means for calculating a rear-wheel deceleration from said detected rotational speed;

determining means for determining that a rear-wheel grounding load is less than or equal to a predetermined value when said deceleration is continuously smaller than a preset value for a predetermined period of time or longer while front-wheel and rear-wheel brakes are being operated; and controlling means for reducing and controlling a braking force of the front-wheel brake based on the result of determination by said determining means.

12. A system according to any one of claims 6, 7, 8, 9, 10 and 11, wherein deceleration detecting means for detecting a deceleration is provided as an alternative to said detecting means and said calculating means.

13. A system according to any one of claims 6, 7, 8, 9, 10 and 11, further including hydraulic pressure detecting means for detecting caliper hydraulic pressure of the front-wheel brake and wherein said determining means determines that the grounding load of the rear wheel is less than or equal to a predetermined value when said caliper hydraulic pressure is larger than a predetermined hydraulic pressure value.

* * * * *